United States Patent Office 3,399,162
Patented Aug. 27, 1968

3,399,162
NON-FLAMMABLE SOLVENT SYSTEMS FOR
EPOXY RESIN COATINGS
Morris Salame, Windsor, Conn., assignor to Monsanto Company, St. Louis, Mo., a corporation of Delaware
No Drawing. Continuation-in-part of application Ser. No. 383,257, July 16, 1964. This application Dec. 11, 1964, Ser. No. 417,785
3 Claims. (Cl. 260—33.2)

ABSTRACT OF THE DISCLOSURE

A solvent system for epoxy resins utilizing a chlorinated hydrocarbon mixture comprising trichloroethylene, a liquid chlorinated hydrocarbon having an atmospheric boiling point of up to 61° C., and another liquid chlorinated hydrocarbon having an atmospheric boiling point above 61° C.

---

This application is a continuation-in-part of my co-pending application S.N. 383,257, filed July 16, 1964. It relates to novel solvent systems for coating compositions. More particularly, it relates to novel non-flammable solvent systems for epoxy resin coating compositions for application to containers.

Epoxy resins and mixtures thereof with other resinous compositions are used in surface coating applications and are particularly useful as coatings and liners on containers. Conventional solvents for epoxy coating compositions present, in general, a flammability problem. Chlorinated hydrocarbons, which are non-flammable, have been proposed as solvents for such systems but have never been used commercially because of the high evaporation rate and poor pot-life characteristics of the lower boiling members of this class on the one hand and the retention of residual chlorinated hydrocarbon solvent in the lining or coating from use of the higher boiling members of this class on the other hand. The retention of residual chlorinated hydrocarbon in the lining in coating results in the general contamination of products packaged in the container and, in certain instances, prevents obtaining approval of the Food and Drug Administration.

It is an object of this invention, therefore, to provide a novel combination of chlorinated hydrocarbons suitable for commercial use as solvents for epoxy resin coating compositions.

Another object is the provision of a novel combination of chlorinated hydrocarbons suitable for use as non-flammable solvents in epoxy coating compositions and which provide coatings or linings substantially free of residual chlorinated hydrocarbons.

A further object is the provision of a novel amine-curable epoxy surface coating composition wherein the solvent is essentially a novel combination of chlorinated hydrocarbons and which provide coatings or linings substantially free of residual chlorinated hydrocarbons.

These and other objects are attained through the provisions of a coating composition comprising a solution of an epoxy resin and a hardener in a solvent wherein at least 50% by weight of the active solvent components are a particular mixture of chlorinated hydrocarbons; said particular mixture of chlorinated hydrocarbons comprising (a) from 50 to 70% by weight of trichloroethylene,
(b) from 30 to 50% by weight of a liquid chlorinated hydrocarbon having an atmospheric boiling point of up to 61° C. and
(c) from zero to 10% by weight of a liquid chlorinated hydrocarbon having an atmospheric boiling point of above 61° C.

The following examples are presented in illustration of the invention and are not intended as limitations thereon. Where parts are mentioned, they are parts by weight.

EXAMPLE I 100 parts of a commercial bisphenol-type resin having an epoxide equivalent of about 180 and containing about 28% by weight of the hereinafter defined Aromatic Epoxy Resin D in combination with about 72% by weight of the hereinafter defined Aromatic Epoxy Resin B, 30 parts of a commercial polyglycol diepoxide resin having an epoxide equivalent of about 320 and corresponding to the hereinafter defined Aliphatic Epoxy Resin E, 30 parts of Hardener C (hereinafter defined), 0.8 part of p-toluene sulfonic acid and 1.6 parts of polyoxy (20) ethylene sorbitan tristearate are intimately admixed. This mixture is then thinned to about 50% solids by weight with a solvent mixture consisting of:

| Component— | Parts |
|---|---|
| Trichloroethylene | 49 |
| Tetrachloroethylene | 6 |
| Toluene | 25 |
| Dichloromethane | 20 |
| Ethylene glycol nonbutyl ether sold under the trademark butyl "Cellosolve" by Union Carbide Corporation | 50 |

4 ounce low density polyethylene bottles are then flame treated on all exterior surfaces to assure good adhesion of polar compounds and in this instance of the coating solution to the bottles, substantially as described in U.S. Patents 2,632,921 and 2,704,382. The polyethylene surface can be alternately pretreated by sulfuric acid-dichromate solution (U.S. Reissue Patent 24,062) or propane-oxygen explosion treatment or any other suitable treatment which will assure good adhesion of the coating. The bottles are then dipped directly into the coating solution, prepared as above and are then allowed to drain. The bottles are then dried in a forced air oven at 180–220° F. for 8 to 15 minutes. The resulting coatings are clear, colorless and odorless, possessing a very high gloss approaching that of glass.

EXAMPLE II

Example I is repeated substituting 100 parts of a commercial bisphenol-type resin having an epoxide equivalent of about 180 and containing about 35% by weight of the hereinafter defined Aromatic Epoxy Resin C in combination with about 65% by weight of the hereinafter defined Aromatic Epoxy Resin A, for the mixture of Aromatic Epoxy Resins B and D employed therein. The resulting coatings are clear, colorless and odorless, possessing a very high gloss approaching that of glass.

EXAMPLE III 100 parts of a commercial bisphenol-type resin having an epoxide equivalent of about 180 and containing about 28% by weight of the hereinafter defined Aromatic Epoxy Resin D in combination with about 72% by weight of the hereinafter defined Aromatic Epoxy Resin B, and 33 parts of Hardener C (hereinafter defined) are intimately admixed. This mixture is then thinned to about 45% solids by weight with the same solvent mixture as used in Example I. 4 ounce low density polyethylene bottles are then prepared and pretreated as in Example I. The interiors of the bottles are then lined by spraying the interiors of the bottles to form films approximately 0.0075" thick followed by drying in a forced air oven at 180–220° F. for 30 to 60 minutes. The resulting linings are clear, slightly amber, and odorless, possessing a very high gloss approaching that of glass.

EXAMPLE IV 100 parts of a commercial bisphenol-type resin having an epoxide equivalent of about 180 and containing about 10% by weight of the hereinafter defined Aromatic Epoxy Resin C in combination with about 90% by weight of the hereinafter defined Aromatic Epoxy Resin A, 30 parts of Hardener C (hereinafter defined), and 0.8 part of p-toluene sulfonic acid are intimately admixed. This mixture is then thinned to about 50% solids by weight with a solvent mixture consisting of:

| Component— | Parts |
|---|---|
| Trichloroethylene | 50 |
| Dichloromethane | 40 |
| Butyl Cellosolve | 10 |

4 ounce polyethylene bottles are then treated and lined as in Example III. The resulting linings are clear, colorless and odorless, possessing a very high gloss approaching that of glass.

The following example demonstrates that all of the bottle coatings or linings prepared in Examples I–IV, supra, are substantially free of residual chlorinated hydrocarbon.

EXAMPLE V

Each of the bottles coated in Examples I–IV, supra, are tested for residual chlorinated hydrocarbons using the extraction method set forth in the Federal Register, as amended Jan. 25, 1964, section 121.2514, paragraph E One bottle from each of Examples I–IV is either filled with water at 120° F. or immersed in a quantity of water equal to the fill volume of the bottle, depending on whether the bottle was coated or lined, and maintained at such temperature for 24 hours. Another bottle from each of Examples I–IV is filled with or immersed in heptane at room temperature and maintained thereat for 20 minutes. Finally, a third bottle from each of Examples I–IV is filled with or immersed in 8% aqueous solution of ethyl alcohol at 120° F. and maintained thereat for 24 hours. In each instance, analysis of the extractant for the presence of chlorinated hydrocarbon shows the bottle coating or lining to be substantially free of chlorinated hydrocarbon; i.e., below about 8 parts per million.

The following examples, VI–X, are presented for comparative purposes to demonstrate the following propositions: Examples VI–VII, that trichloroethylene as the sole chlorinated hydrocarbon solvent does not provide adequate coatings; Examples VIII–IX, that dichloromethane, a low boiling, i.e., below 61° C., chlorinated hydrocarbon does not provide adequate coatings when used as the sole chlorinated hydrocarbon solvent; and Example X, that carbon tetrachloride and tetrachloroethylene, high boiling, i.e., above 61° C., chlorinated hydrocarbons, do not provide adequate coatings when used as the sole chlorinated hydrocarbon solvents.

EXAMPLE VI

Example I is repeated substituting 100% trichloroethylene for the solvent mixture employed therein. The resulting coatings are clear and colorless but contain large amounts of trapped residual trichloroethylene as evidenced by odor as well as by extraction and analysis performed as per Example V.

EXAMPLE VII

Example I is repeated substituting a mixture of 60 parts of trichloroethylene and 40 parts of butyl Cellosolve for the solvent mixture employed therein. The resulting coatings are clear and colorless but contain large amounts of trapped residual trichloroethylene as evidenced by odor as well as by extraction and analysis performed as per Example V.

EXAMPLE VIII 100 parts of a commercial bisphenol-type resin having an epoxide equivalent of about 180 and containing about 35% by weight of the hereinafter defined Aromatic Epoxy Resin C in combination with about 65% by weight of the hereinafter defined Aromatic Epoxy Resin A, 30 parts of a commerical polyglycol diepoxide resin having an epoxide equivalent of about 320 and corresponding to the hereinafter defined Aliphatic Epoxy Resin E, 30 parts of Hardener C (hereinafter defined), 0.8 part of p-toluene sulfonic acid and 1.6 parts of polyoxy (20) ethylene sorbitan tristearate are intimately admixed. This mixture is then thinned to about 50% solids by weight with dichloromethane. 4 ounce low density polyethylene bottles are then prepared, coated and evaluated exactly as in Example I. The resulting coatings are characterized by a rough surface as a result of a profusion of pin-holes and bubbles. An attempt to use lower temperature results in poor cure of the coating.

EXAMPLE IX

Example VIII is repeated substituting a mixture of 60 parts of dichloromethane and 40 parts of butyl Cellosolve for the dichloromethane employed therein. The resulting coatings are characterized by a rough surface as a result of a profusion of pin-holes and bubbles. An attempt to use lower temperature results in poor cure of the coating.

EXAMPLE X

Attempts to repeat Examples I and II employing either carbon tetrachloride or tetrachloroethylene as the solvent fail due to coagulation of the Epoxy resins in the coating compositions.

The epoxy resin may be any conventionally used in the manufacture of coating compositions. These are epoxy polyhydroxy polyether resins formed by methods well known in the art. In many cases these are the coreaction products of epihalohydrins with polyglycols or polyhydric phenols. Typical polyhydric phenols are bisphenol A, bisphenol F, phenol-formaldehyde condensates, polyhydroxy polyphenyl alkanes such as dihydroxy diphenyl propane. Thus, typical epoxy resins suitable for use in practice of this invention include, for example, diglycidyl ethers of dihydroxy diphenyl propane and the coreaction products of epichlorohydrin with bisphenol A or bisphenol F with or without added components such as epihydrin alcohol. Used in the working examples of this specification are the following epoxy resins:

(A) The reaction product of (1) epichlorohydrin, (2) epihydrin alcohol and (3) p,p′-dihydroxydiphenyldimethyl methane (bisphenol A), herein referred to as Aromatic Epoxy Resin A which has the following structure:

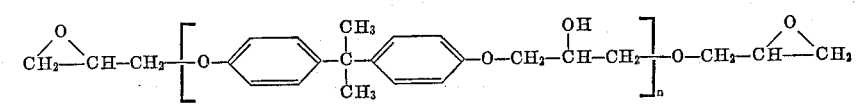

(B) The reaction product of (1) epichlorohydrin, (2) epihydrin alcohol and (3) p,p′-dihydroxy diphenyl methane (bisphenol F), herein referred to as Aromatic Epoxy Resin B which has the following structure:

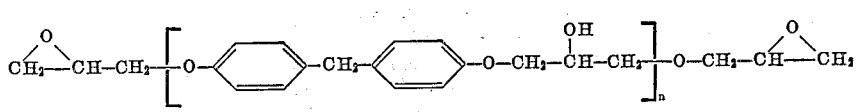

(C) The reaction product of (1) epichlorohydrin and (2) dimethyl, p - hydroxyphenyl, p - hydroxy-o-(hydroxybenzyl)phenyl methane, herein referred to as Aromatic Epoxy Resin C which has the following structure:

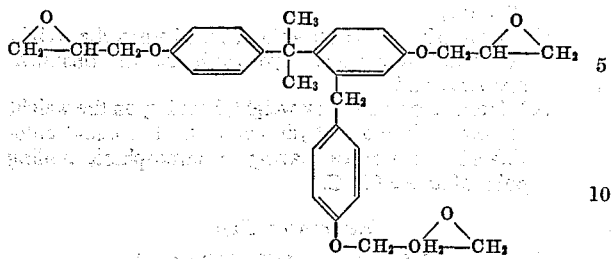

(D) The reaction product of (1) epichlorohydrin and (2) 3,4-di-(p-hydroxybenzyl)phenol, herein referred to as Aromatic Epoxy Resin D which has the following structure:

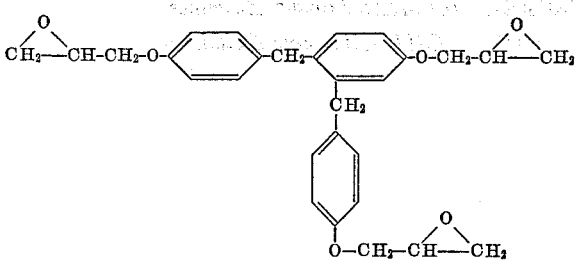

wherein, in each instance, $n$ has a value providing an epoxide equivalent of from 150 to 250, and (E) A polyglycol diepoxide (an aliphatic epoxy resin) which has the following structure:

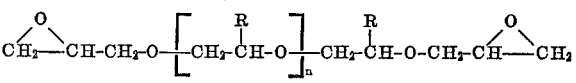

wherein $n$ has a value providing an epoxide equivalent of from about 160 to 500 and each R is an independently selected member of the class consisting of hydrogen and lower alkyls.

Any of the conventional hardeners may be employed to cure the epoxy resin. Epoxy resins may be readily hardened or cured to an insoluble, infusible state by reaction of the epoxy and hydroxyl groups with cross-linking agents including polyamines, such as, e.g., metaphenylene diamine, diethylene triamine and the polyethylene polyamines; diisocyanates, such as, e.g., methylene bis-(4-phenyl) isocyanate; dialdehydes, such as, e.g., glyoxal; dimercaptans; and amides and polyamides, such as those disclosed in U.S. Patent 2,705,223. Preferably, a proportion of from 1 to 10 parts by weight, and particularly 3 to 6 parts by weight, of epoxy resin solids will be cured by 1 part by weight of hardener. The coating compositions of this invention contain the hardener in admixture with the aforesaid mixture of aromatic and aliphatic epoxy resins. The hardener or cross-linking agent employed in the working examples is a polyamine herein referred to as Hardener C and has the following approximate structure:

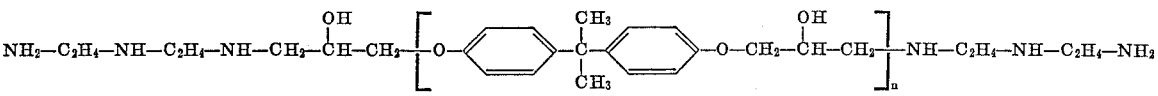

wherein $n$ is an integer. Again, mixtures are commonly available and $n$ may have an average value of from about 1 to 5, and preferably about 1.

The solvent systems of this invention comprise at least 50% by weight of a particular combination of liquid chlorinated hydrocarbons. Correspondingly, the remaining zero to 50 weight percent of the solvent system may be any conventional, non-chlorinated organic solvent for amine-cured epoxy resins.

The particular combination of chlorinated hydrocarbons comprises:

(a) from 50 to 70% by weight of trichloroethylene,
(b) from 30 to 50% by weight of a liquid chlorinated hydrocarbon having an atmospheric boiling point of up to and including 61° C. such as, for example, trichloromethane, 1,1-dichloroethane, 1,1-dichloroethylene, 1,2-dichloroethylene etc. any of which may be substituted for the dichloromethane used in the working examples with equivalent results, and
(c) from zero to 10% by weight (thus, an optional component) of a liquid hydrocarbon having an atmospheric boiling point of above 61° C. such as, for example, tetrachloromethane, 1,2-dichloroethane, 1,1,1-trichloroethane, 1,1,2-trichloroethane, pentachloroethane, tetrachloroethylene, 2-chloropropane, 1,2,3-trichloropropane, 3-chloropropylene-1, 3,3-dichloropropylene-1, 2,3-dichloropropylene-1, etc., any of which may be substituted for the tetrachloroethane used in the working examples with equivalent results.

If desired, mixtures of such chlorinated hydrocarbons boiling at up to 61° C. and/or mixtures of such chlorinated hydrocarbons boiling at above 61° C., may be used as components (b) and (c), respectively.

The conventional, non-chlorinated organic solvents which may optionally be used in conjunction with the particular combination of chlorinated hydrocarbons, discussed above, include such solvents as, for example, toluene, methylethyl ketone, methylisobutyl ketone, methylisoamyl ketone, mixtures of toluene or xylene with methylethyl ketone, etc.; ethylene glycol monoethers sold under the trademark Cellosolve by Union Carbide Corporation such as methyl "Cellosolve," ethyl "Cellosolve," butyl "Cellosolve," etc.

The coating compositions prepared using the chlorinated hydrocarbon solvents of this invention may contain other resinous components in addition to the epoxy resin. For example, amine-aldehyde condensates such as urea-formaldehyde, melamine-formaldehyde, etc. resins are often used in combination with epoxy resins. Other conventional additives such as curing accelerators, antistatic compounds, viscosity control additives, stabilizers, colorants, etc. may also be added to the coating compositions.

The mechanical methods of applying the coating to the substrate surfaces are well known to the art and details of the operation and functioning of spray coating units suitable herefor may be found, for instance, in Patents 2,059,706, 2,069,844 and 2,547,884.

While the working examples illustrate the use of the coating compositions of this invention in the coating and lining of polyethylene bottles, they are suitable for use in conjunction with any type of container where epoxy resins have found or may find use. Examples of other containers include tinplate cans, aluminum cans, drums and pails, collapsible metal tubes, bottle caps and other closures, glass containers, etc.

It is obvious that many variations may be made in the products and process set forth above without departing from the spirit and scope of this invention.

What is claimed is:

1. A coating composition comprising a solution of an epoxy resin which is the reaction product of a glycidyl ether with a polyhydric alcohol, selected from the group consisting of polynuclear aromatic alcohols, aliphatic alcohols and mixtures thereof, and a hardener in an organic solvent wherein at least 50% by weight of the organic solvent consists of a mixture of chlorinated hydrocarbons; said mixture of chlorinated hydrocarbons comprising:

(a) from 50 to 70% by weight of trichloroethylene,
(b) from 30 to 50% by weight of a liquid chlorinated hydrocarbon having an atmospheric boiling point of up to 61° C., and
(c) from zero to 10% by weight of a liquid chlorinated hydrocarbon having an atmospheric boiling point of above 61° C.

2. A coating composition as in claim 1 wherein the mixture of chlorinated hydrocarbons comprises:
(a) from 50 to 70% by weight of trichloroethylene,
(b) from 30 to 50% by weight of dichloromethane, and
(c) from zero to 10% by weight of a liquid chlorinated hydrocarbon having an atmospheric boiling point above 61° C.

3. A coating composition as in claim 1 wherein the organic solvent comprises from zero to 50% by weight of monobutyl ether of ethylene glycol and, correspondingly, from 100 to 50% by weight of a mixture of chlorinated hydrocarbons consisting of:
(a) from 50 to 70% by weight, based upon the weight of total chlorinated hydrocarbons, of trichloroethylene,
(b) from 30 to 50% by weight, based upon the weight of total chlorinated hydrocarbons, of dichloromethane, and
(c) from zero to 10% by weight, based upon the weight of total chlorinated hydrocarbons, of a liquid chlorinated hydrocarbon having an atmospheric boiling point of above 61° C.

References Cited

UNITED STATES PATENTS

| | | | |
|---|---|---|---|
| 2,643,243 | 6/1953 | Dannenberg | 260—33.8 |
| 2,836,319 | 5/1958 | Pinsky et al. | 117—138.8 |

MORRIS LIEBMAN, *Primary Examiner.*

J. E. CALLAGHAN, *Assistant Examiner.*